Oct. 25, 1966
A. RUGGIERO
3,280,952
EQUIPMENT FOR COLLECTING OLIVES
Filed April 24, 1963
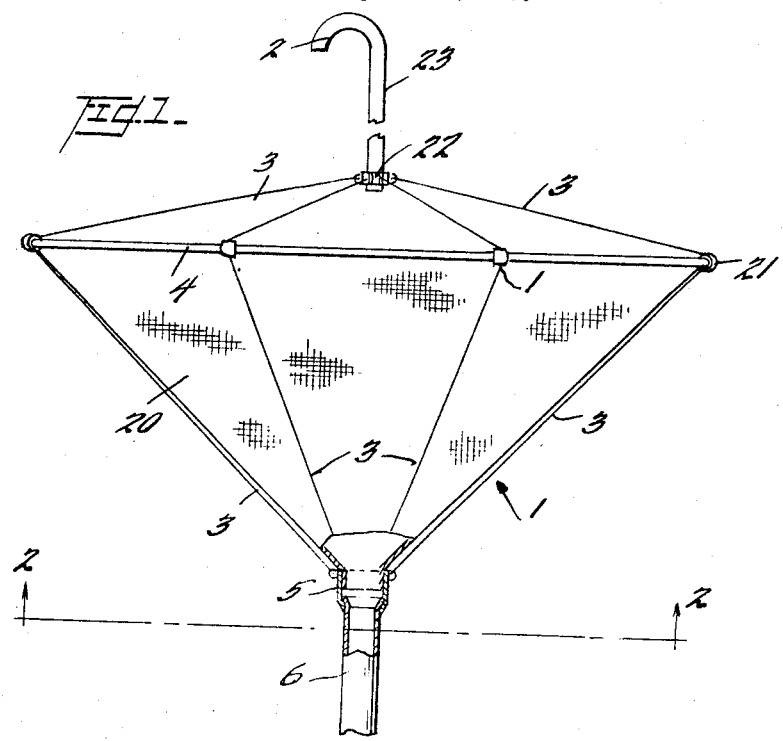
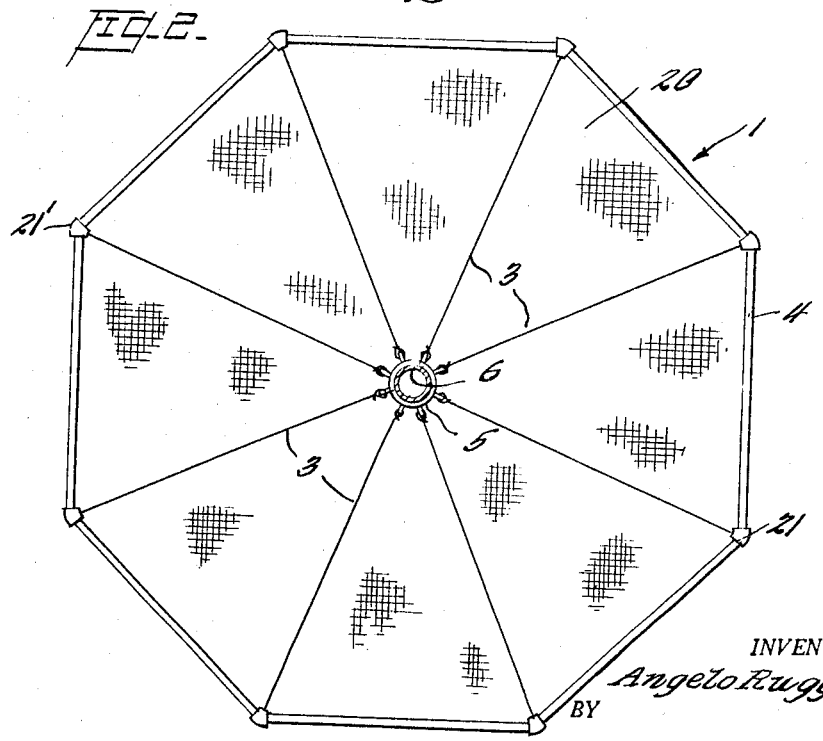
INVENTOR.
Angelo Ruggiero
BY
Watson, Cole, Grindle & Watson
ATTORNEYS 3,280,952
EQUIPMENT FOR COLLECTING OLIVES
Angelo Ruggiero, Santa Maria-Frazione
Marcellina, Cosenza, Italy
Filed Apr. 24, 1963, Ser. No. 275,302
Claims priority, application Italy, June 19, 1962, 13
1 Claim. (Cl. 193—7)

In the art of collecting olives two systems are generally made use of: A first system consisting in picking up drupes from the ground onto which they had dropped sometime previously; and a second system consisting in picking up from the ground the fruits which the picker had dropped previously. The first system does not prove convenient from a practical point of view insofar as the olives spread on the ground during a considerable period of time start to undergo fermentation with the consequences easy to be deduced. Also the second system is not at all satisfactory, insofar as the fruit, by striking the ground breaks up, thus rendering possible the collection of impurities and, consequently, impairing the quality of the oil to be obtained therefrom.

An object of the present invention is to provide adequate olive picking equipment intended to prevent the collection of drupes in the manner described above.

The invention is illustrated merely by way of example, without any limitation, in the accompanying drawing in which:

FIG. 1 is a side view partly in section of a large cone-shaped receptacle;

FIG. 2 is a sectional view of the cone-shaped receptacle taken along the line 4—4 of FIGURE 1.

Referring to the drawings, the large receptacle 1 is generally cone-shaped. A fabric or other suitable material 20 in a cone shape is secured along its periphery to a frame member 4 which is shaped in the form of a polygon or, more specifically in this instance, an octagon. The frame member is preferably made of steel and may, if desired, be formed in two equal sections such that the frame member may be easily dismantled to reduce the over-all dimensions of and simplify storage of the receptacle when not in use. The two sections may be secured together when the receptacle is in use by inserting the ends of the frame sections into two sleeves 21, 21′.

The central portion of the fabric cone has an opening therein, the edges of which are secured to a sleeve 5. A long flexible tube 6 is also secured to the sleeve and extends downwardly from the receptacle.

Also secured to the sleeve 5 are a plurality of heavy cords or strings 3 which radiate outwardly from the end of the tube 6 below the fabric and are secured generally equidistant from each other to the frame member 4. From the frame member the same cords or different cords 3 converge and the opposite ends of the cords are secured to a clamp member 22 which in turn is secured to the straight end of the cane-shaped member 23, the opposite end terminating in a hook 2. The cane-shaped member is designed to be hooked onto a branch of a tree, thus placing a tension on the heavy cords 3 which serve to support the fabric in a cone shape.

The use and working of the implement according to the invention are clearly understood from what is disclosed above.

The large cone-shaped receptacle 1 is suspended from a branch by means of the hook 2 on the end of the cane-shaped member 23. Even a small size branch will support the receptacle owing to its light weight. The tube 6 is of sufficient length to reach a container placed on the ground for receiving the olives dropped into the cone-shaped receptacle. The person picking olives or other fruit upon severing it from the tree drops it into the cone-shaped receptacle where it slides towards and into the tube 6. The fruit passes through the tube 6, which is preferably flexible, into the collecting container.

The advantages offered by the use of the equipment according to the invention may be summarized as follows:

The olives may be collected before they are completely ripe. The equipment is designed to minimize the possibility of the olives falling to the ground thus doing away with considerable additional time and labor. The olives are easily collected in the large receptacle and are automatically carried directly to the collecting container. The equipment is simply designed and easily handled without much prior instruction and may be manufactured at moderate cost due to the simplicity of the component parts.

The invention has been described and illustrated by way of example only, without any limitation.

What I claim is:

A cone-shaped receptacle for collecting fruit directly from a tree comprising a cane-shaped member one end being straight and the opposite end being hooked, a polygon-shaped frame composed of at least two sections of equal size detachably secured together such that said receptacle may be easily dismantled, a plurality of cords extending radially from said straight end of the cane-shaped member, means for securing said cords to said cane-shaped member and to said frame, a tube, a plurality of cords extending from said frame to one end of said tube, means for securing said cords to said frame, a sleeve member for securing said cords to said tube, and a cone-shaped fabric member having a centrally located opening therein, the periphery of said fabric member being secured to said frame and the edges of said fabric member surrounding said opening being secured to the end of said tube whereby fruit dropped onto said fabric member is conveyed to and into said tube.

References Cited by the Examiner
UNITED STATES PATENTS

| | | | |
|---|---|---|---|
| D. 27,209 | 6/1897 | Plumley | 56—339 X |
| 310,434 | 6/1885 | Huber | 56—328 X |
| 670,940 | 4/1901 | Schreder | 193—7 |
| 705,365 | 7/1902 | Law | 56—328 |
| 1,276,453 | 8/1918 | Tussing | 193—7 |
| 1,309,119 | 6/1919 | Dillon | 193—7 |
| 1,839,712 | 1/1932 | Sturtz | 193—7 |
| 3,115,960 | 12/1963 | Ott | 193—7 |

EVON C. BLUNK, *Primary Examiner.*

RUSSELL R. KINSEY, SAMUEL F. COLEMAN,
*Examiners.*

A. L. LEVINE, A. H. NIELSEN,
*Assistant Examiners.*